United States Patent
Gibbs et al.

(10) Patent No.: US 6,362,937 B1
(45) Date of Patent: Mar. 26, 2002

(54) AIR VANE WINDAGE ACCELERATOR APPARATUS FOR A DISC DRIVE

(75) Inventors: Robert M. Gibbs, Longmont; Bruce J. Oxley, Boulder, both of CO (US)

(73) Assignee: Seagate Technology LLC, CA (US)

(*) Notice: Subject to any disclaimer, the term of this patent is extended or adjusted under 35 U.S.C. 154(b) by 0 days.

(21) Appl. No.: 09/470,564

(22) Filed: Dec. 22, 1999

Related U.S. Application Data

(60) Provisional application No. 60/130,288, filed on Apr. 21, 1999.

(51) Int. Cl.$^7$ .................... G11B 5/54; G11B 21/22; G11B 33/14
(52) U.S. Cl. .................... 360/256.1; 360/97.02
(58) Field of Search .................... 360/256, 256.1, 360/256.6, 254, 250, 240, FOR 205, 97.01, 97.02, 97.03

(56) References Cited

U.S. PATENT DOCUMENTS

| | | | |
|---|---|---|---|
| 4,054,931 A | 10/1977 | Bolton et al. | 360/97.03 |
| 4,130,845 A | 12/1978 | Kulma | 360/97.03 |
| 4,249,221 A | 2/1981 | Cox et al. | 360/97.02 |
| 4,363,057 A | * 12/1982 | Siverling et al. | 360/97.03 |
| 4,587,645 A | * 5/1986 | Wong et al. | 369/75.1 |
| 4,725,904 A | 2/1988 | Dalziel | 360/78.13 |
| 5,031,059 A | 7/1991 | Yamaguchi et al. | 360/97.03 |
| 5,034,835 A | 7/1991 | Yokoyama | 360/97.02 |
| 5,140,578 A | 8/1992 | Tohkairin | 360/75.2 |
| 5,212,679 A | 5/1993 | Tohkairin | 360/75.2 |
| 5,517,372 A | 5/1996 | Shibuya et al. | 360/97.02 |
| 5,521,776 A | 5/1996 | Mochizuki | 360/97.02 |
| 5,541,791 A | * 7/1996 | Yamasaki et al. | 360/256.1 |
| 5,768,058 A | * 6/1998 | Hofland | 360/256.1 |
| 5,898,545 A | * 4/1999 | Schirle | 360/254.7 |

* cited by examiner

Primary Examiner—Robert S. Tupper
Assistant Examiner—Julie Anne Watko

(57) ABSTRACT

An apparatus for accelerating and concentrating wind generated by spinning discs in a disc drive includes a stationary air vane member mounted on a disc drive base plate beneath a bottom disc. The air vane member preferably has a rib with an upper edge in a plane parallel to the plane of rotation of the disc adjacent a bottom surface of the disc and curves from the inner diameter of the disc to the outer diameter in the direction of rotation of the disc. The rib terminates adjacent a wind actuated pivoting air filter latch which holds an actuator assembly in a parked position when the drive is de-energized. This arrangement accelerates and concentrates the wind at the latch apparatus to increase wind force on the pivoting air filter latch to move the latch to an unlatched position when the rotating discs reach normal operating speed to permit the actuator to move from the parked position.

17 Claims, 3 Drawing Sheets

AIR VANE WINDAGE ACCELERATOR APPARATUS FOR A DISC DRIVE

RELATED APPLICATIONS

This application claims the benefit of priority of United States Provisional Patent Application Ser. No. 60/130,288 entitled "AIR VANE WINDAGE ACCELERATOR", filed Apr. 21, 1999.

FIELD OF THE INVENTION

This application relates to magnetic disc drives and more particularly to an apparatus for increasing operational wind force on a latching device for latching a disc drive actuator mechanism in a parked position when the drive is de-energized.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

When the drive is de-energized or shut down, the drive motor stops spinning and the actuator is rotated, for example, counterclockwise to position the heads at an inner diameter landing zone location and latch the actuator in this position. Often a magnetic latch is used to maintain the actuator in this position with the heads in the landing zone. When a magnetic latch is used, an inadvertent external shock load, such as the drive being dropped, may cause sufficient rotational force to be applied to the actuator arms to overcome the magnetic attraction and thus the actuator arm may rotate from the landing zone to the data region of the discs without the discs spinning at all. This could destroy the stored data and could destroy the heads themselves. Consequently there is a need for a latch mechanism that ensures that the actuator stays in the parked position any time that the disc drive motor is de-energized and, more importantly, the discs are not spinning.

This de-energized latching has been traditionally accomplished by a wind operated latching mechanism which utilizes wind generated by the spinning discs while the drive motor is energized to push against a pivoting air filter member positioned adjacent the outer margin of the discs. This air filter member has a pivot portion, an air filter portion, and an elongated air vane which extends outward from the air filter portion over the top disc in the disc stack. The air vane is directly in the path of air drawn along the surface of the disc by the rotating disc. This moving air is a wind which pushes against the air vane, tending to rotate the air filter member about its pivot in a clockwise direction as viewed from above. Extending from the opposite side of the pivot portion of the air filter member is an elongated latch arm and a tab portion which carries a steel ball therein. The steel ball in the tab portion is positioned in the magnetic field generated by the VCM magnets and thus biases the latch on a counterclockwise direction such that the latch arm interferes with rotational movement of the actuator arm off of the magnetic latch when the drive is de-energized.

The operation of this conventional latch mechanism is completely automatic, driven only by the VCM magnet magnetic field bias and the force exerted by wind against the air filter and the air vane when the discs are spinning at normal speed. The size and placement of the steel ball on the tab portion are dictated by the requirement that the latch be disengaged when the discs are operating at full speed and engaged when the discs are turning at less than full operating speed with the actuator arm moved into the parked position.

The conventional air vane design has worked well for drives with three or four or more operating discs in the head disc assembly (HDA). However, in the case of drives designed for four discs and having only one or two discs installed, there have been cases where the air vane latches failed to move to the disengaged position when the drive is energized, thus preventing actuator movement and appearing to the user by the software as a disc crash or disc drive failure. In these cases, the failures appear to have occurred at high altitudes. Accordingly, there is a need for a magnetic wind operated latching apparatus for use in disc drives having only one or two discs which automatically disengages the actuator arm when the disc drive motor spins the discs at operating speed and engages the actuator arm when the disc or discs spin at less than operating speed and the actuator arm is in the parked position in a head disc assembly (HDA) designed to accommodate up to four or more discs.

SUMMARY OF THE INVENTION

Against this backdrop the present invention has been developed. The present invention is a stationary air vane member adapted to be fastened to a disc drive baseplate beneath a single spinning disc in a HDA designed to carry two or more discs on the drive motor spindle. The air vane member acts to accelerate wind which is generated by the rotating disc in the HDA and direct it to a pivoting air filter which typically has an air vane which extends over the upper surface of a top disc on the disc drive motor. This arrangement provides an additional moment arm on the pivoting air filter when only one disc is located on the drive motor in the HDA. This stationary air vane provides a narrowing channel beneath the spinning disc directing wind generated by the spinning disc toward the air filter portion of the latch member thus capturing additional air flow and thus providing an additional moment arm on the air filter latch when the drive is utilized at high elevations where the air is thinner. This stationary air vane member may also permit a larger steel ball to be utilized in the conventional latch apparatus thereby ensuring more positive latch and unlatch operations of the apparatus.

These and various other features as well as advantages which characterize the present invention will be apparent from a reading of the following detailed description and a review of the associated drawings.

DETAILED DESCRIPTION

Figure 1:
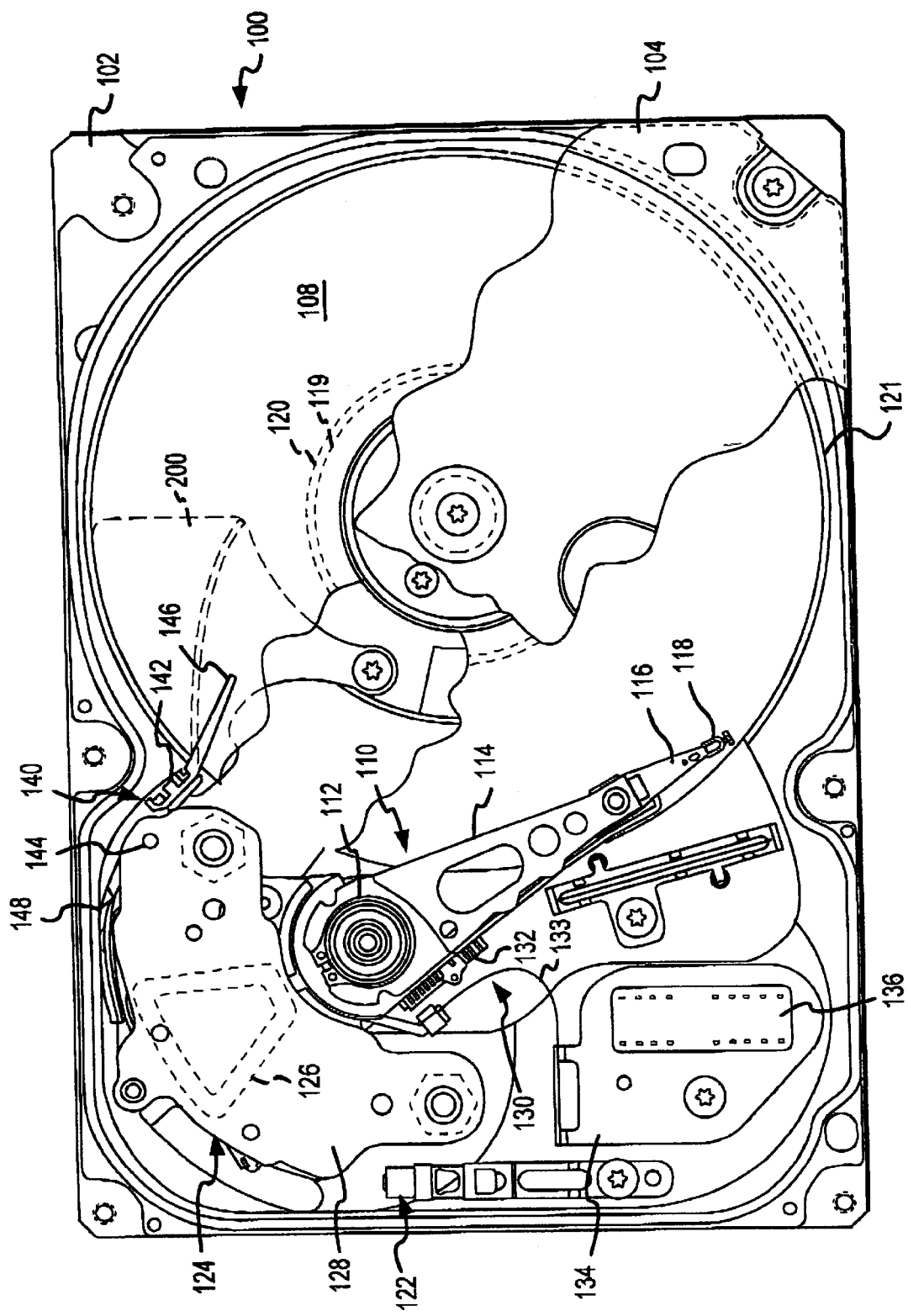
FIG. 1 is a plan view of a disc drive incorporating a air vane windage accelerator apparatus in accordance with a preferred embodiment of the invention with the head disc assembly cover removed.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. This assembly is called a head disc assembly (HDA). The components include a spindle motor 106 which rotates one or more discs 108 at a constant high speed. Each disc 108 has a data recording media on upper and lower surfaces extending between a inner radius 119 and an outer radius 121. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

Figure 3:
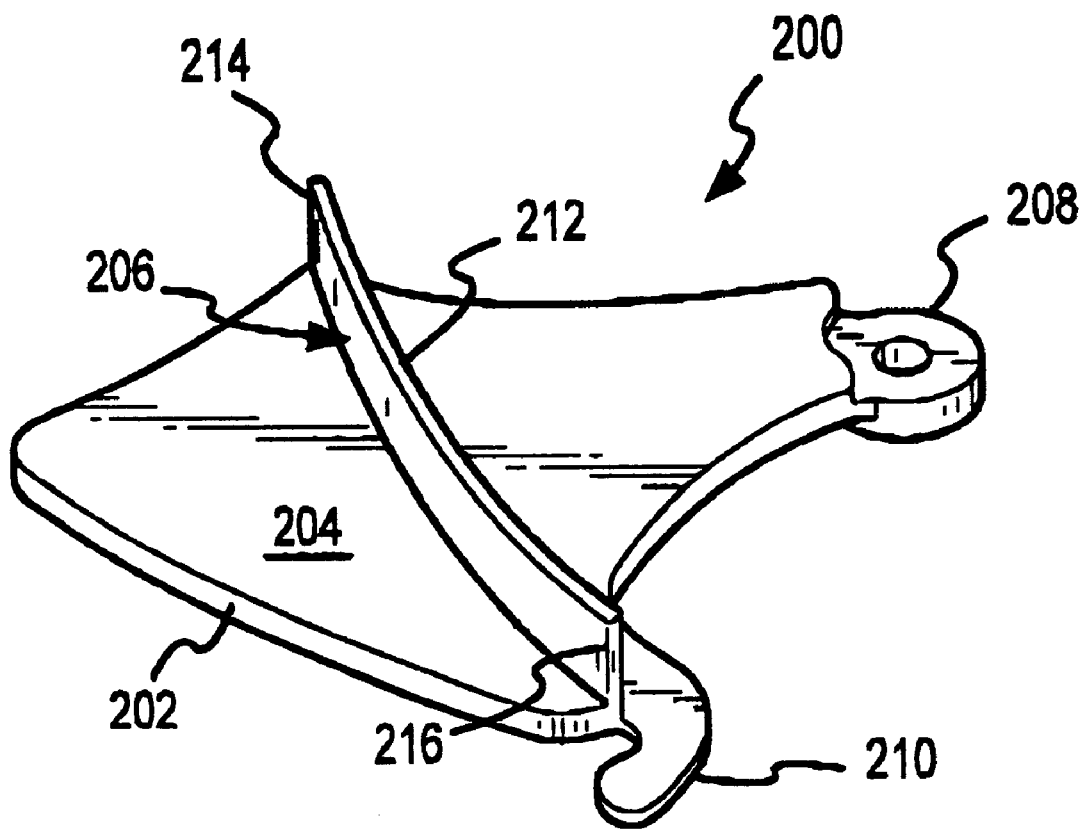
FIG. 3 is a perspective separate view of the air vane windage accelerator apparatus in accordance with the preferred embodiment of the present invention shown in FIG. 2.

The spindle motor 106 is typically de-energized when the disc drive 100 is not in use for extended periods of time. The heads 118 are moved over a park zone 120 near the inner radius 119 of the discs 108 when the drive motor is de-energized as shown in FIG. 3. The heads 118 are secured over the park zone 120 near the inner radius 119 of the disc 108 through the use of an actuator latch arrangement 122, which prevents inadvertent rotation of the actuator arms 114 when the heads are parked.

The radial position of the heads 118 is controlled through the use of a voice coil motor (VCM) 124, which typically includes a coil 126 attached to the actuator assembly 110, as well as one or more permanent magnets 120 and return plates 128 which are spaced apart and establish a vertical magnetic field between them in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a preamplifier printed circuit board 132 fastened to the actuator arm 114 to which head wires (not shown) are connected; the head wires being routed along the actuator arms 114 and the flexures 116 to the heads 118. The preamplifier printed circuit board 132 typically includes circuitry for controlling the write currents applied to the heads 118 during a write operation and for amplifying read signals generated by the heads 118 during a read operation. The flex assembly includes a ribbon lead 133 connecting the preamplifier board 132 via a flex bracket 134 to a pass through connector 136 for communication of the electrical signals from the HDA through the base plate 102 to a disc drive printed circuit board (not shown) mounted to the bottom side of the disc drive 100.

Pivotally supported from the magnet return plate 128 is a pivoting air filter and latch apparatus 140. The latch apparatus 140 is shown in FIG. 1 in a disengaged position as would be the case when the drive 100 is at normal operation with the disc 108 rotating at normal speed. The latch apparatus 140 is preferably an injection molded plastic body which has an air filter portion 142 pivotally supported from the upper return plate 128 by a vertical pin 144. The air filter portion 142 supports an air filter. Extending from the air filter portion 142 is an air vane 146 that extends inward over the periphery of the rotating disc 108 and over the disc upper surface so as to catch wind generated by the rotating disc 108. Alternatively, if an air filter is not needed, air filter portion 142 is simply replaced with a pivoting vertical wall portion supporting the air vane 146. Extending in an opposite direction on the opposite side of the pivot pin 144 from the air filter portion 142 is an elongated latch member 148 whose tip engages the coilform 127 of the actuator 110 to keep the actuator latched when the discs 108 are not spinning and the actuator is in the parked and latched position.

Figure 2:
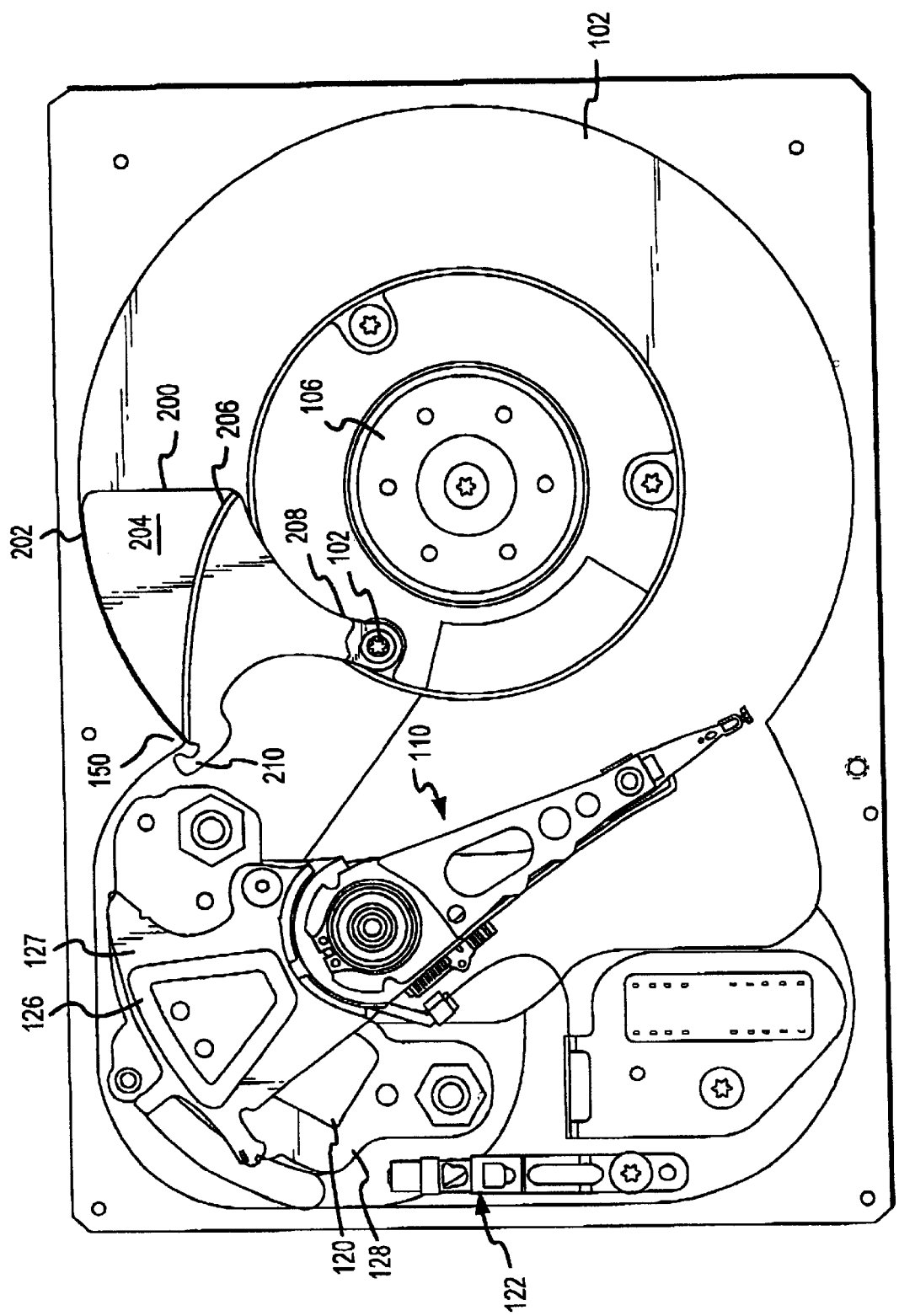
FIG. 2 is a plan view of the disc drive shown in FIG. 1 with the voice coil motor upper magnets and magnet return plate, air vane latch, and data disc removed showing the air vane windage accelerator apparatus installed on the baseplate.

As previously stated, when a HDA designed for 3–4 or more discs carries only one disc, an insufficient amount of wind is generated by the rotating disc under certain conditions to cause the latch apparatus 140 to rotate to the unlatched position upon the disc drive motor 106 reaching operating speed. In order to increase the force of air pressure generated and applied to the air filter portion 142 in this situation, a windage accelerator apparatus 200 is fastened to the baseplate beneath the disc. Referring now to FIGS. 2 and 3, the windage accelerator 200 is shown installed on the baseplate 102 and in a perspective separate view respectively.

The air vane windage accelerator apparatus 200 is preferably a unitary injection molded plastic body having a base 202 having a generally flat lower surface complementary to the baseplate 102, a ramped upper surface 204, and a preferably curved air vane rib 206 projecting from the upper surface 204. The base includes a mounting tab portion 208 for fastening the apparatus 200 to the baseplate 102. Preferably the base 202 of the apparatus 200 also has a hooked alignment tab 210 which engages a boss or other feature on the baseplate 102 to properly orient the base 202 of the apparatus 200 when it is installed on the baseplate 102.

The curved rib 206 curves toward the hook alignment tab 210 which fits beneath the latch apparatus 140 so that the rib 206 funnels wind generated by the rotating disc 108 above toward the air filter 142 of the latch apparatus. The rib 206 thus forms a converging nozzle which collects and concentrates the disc generated wind, increasing the wind velocity thus increasing the force applied against the air filter. This in turn increases the force against the pivoting air filter or against the vertical portion of the air vane which lowers the disc speed at which the air filter and latch 140 rotates open thus ensuring positive opening of the latch apparatus 140.

Referring specifically to FIG. 3, the base 202 has a generally flat bottom which is complementarily contoured to the baseplate 102. The upper surface 204 leading to the rib 206 is preferably sloped or ramped upward to the rib 206. This shape, in combination with the curved rib 206, focuses and concentrates the generated wind toward the tab portion 210 which is positioned in the drive directly beneath the air filter portion 142 of the latch apparatus 140.

The rib 206 is a vertical rib rising from the upper surface 204 of the base 202. The rib 206 has a flat top edge that, when installed on the baseplate 102, lies parallel to the plane of rotation of the disc 108, directly beneath and adjacent the underside surface of the disc 108. The rib 206 curves from an inner end 214 beneath the inner diameter of the disc 108 to an outer end 216 beneath the outer diameter of the disc 108 in the direction of rotation of the disc 108. This outer end 216, when the apparatus 200 is installed in the drive 100, is positioned adjacent the air filter 142 as shown by the dashed outline of the apparatus 200 in FIG. 1.

The mounting tab portion 208 is formed from an extension of the base 202 and is shaped and positioned to fit beneath the head of the spin motor 106 mounting screw 107. The hooked tab 210 is spaced from the mounting portion 208 and extends from the base 202 directly behind the outer rib end 216. As shown in FIG. 2, the tab 210 fits around a corner 150 on the baseplate 102 to locate the apparatus 200 on the baseplate 102.

In summary, the present invention preferably is an air vane windage accelerator apparatus (such as 200) for use in a disc drive (such as 100). The disc drive (such as 100) has a baseplate (such as 102) and a spin motor (such as 106) mounted on the baseplate (such as 102) for rotation of one or more discs (such as 108) mounted on the motor (such as 106). The disc (such as 108) has a data recording media extending between an inner radius (such as 119) and an outer radius (such as 121) on one or more surfaces of the disc (such as 108). An actuator assembly (such as 110) is mounted on the baseplate (such as 102) for rotation of an actuator arm (such as 114) over the surface of the disc (such as 108). An air vane air filter and latch (such as 140) is pivotally mounted for rotation adjacent the outer radius (such as 121) of the disc (such as 108) between a latched position and an unlatched position.

The air vane windage accelerator apparatus (such as 200) is a unitary body fastened to the baseplate beneath the disc (such as 108). The body has a base portion (such as 202) and an upright air vane rib (such as 206) extending toward an underside surface of the disc (such as 108) from the base (such as 202) and toward the air vane filter and latch (such as 140). The rib (such as 206) substantially extends from the inner radius (such as 119) to the outer radius (such as 121) of the disc (such as 108). The air vane rib (such as 206) is preferably curved with one end (such as 216) of the air vane rib positioned adjacent the air vane filter (such as 142) of the air vane filter and latch (such as 140).

The base portion of the apparatus (such as 200) has a ramped upper surface (such as 204). The ramped upper surface (such as 204) ramps upward toward the rotating disc (such as 108) to provide a smooth converging space for the wind to be accelerated toward the air filter (such as 142) of the air vane filter and latch (such as 140). The base portion (such as 202) also has a mounting tab portion (such as 208) which is adapted to be fastened to the baseplate (such as 102) via a spin motor mounting screw (such as 107). The base portion further has a hooked tab portion (such as 210) adapted to fit beneath a portion of the air vane filter and latch (such as 140) to properly orient the apparatus (such as 200) to direct accumulated wind to the air filter portion (such as 142).

Viewed another way, the present invention is a disc drive (such as 100) having a baseplate (such as 102), a spin motor (such as 106) mounted on the baseplate (such as 102), one or more data storage discs (such as 108) having a data storage media on one or more surfaces thereof between an inner radius (such as 119) and an outer radius (such as 121). The disc is rotatably mounted on the spin motor (such as 106) and the drive (such as 100) includes an actuator assembly (such as 110) mounted to the baseplate (such as 102) adjacent the data storage disc (such as 108) for movement of one or more actuator arms (such as 114) over the surfaces of the disc (such as 108) and an air vane air filter and latch (such as 140) pivotally supported adjacent the disc (such as 108) for rotational movement between a latched position and an unlatched position. The air vane air filter and latch (such as 140) prevents rotation of the actuator arms (such as 114) over data portions of the disc (such as 108) unless the spin motor (such as 106) is rotating the data storage disc or discs (such as 108) at operational speed. The drive also has an air vane windage accelerator that is a unitary body fastened to the baseplate beneath the disc. The body has a base portion (such as 202) and an upright air vane rib (such as 206) extending upward toward an underside surface of the disc (such as 108) from the base (such as 202) and substantially extends from the inner radius (such as 119) to the outer radius (such as 121) of the disc (such as 108). This air vane rib is curved, with one end of the air vane rib positioned adjacent the air vane filter and latch (such as 140). The other end (such as 214) of the rib (such as 206) is positioned beneath the inner radius (such as 119) of the disc (such as 108). Preferably the base portion (such as 202) has a ramped upper surface (such as 204). The ramped upper surface (such as 204) ramps upward toward the rotating disc (such as 108) and toward the air vane filter and latch (such as 140). The base portion (such as 202) of the air vane windage accelerator apparatus (such as 200) preferably has a mounting tab portion adapted to be fastened to the baseplate (such as 102) via a spin motor mounting screw (such as 107). The base portion (such as 202) also preferably includes a hooked tab portion (such as 210) adapted to fit beneath a portion of the air vane filter and latch (such as 140).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art For example, the rib 206 may alternatively be straight or may be curved with a different shape than that shown. The upper surface 204 may be flat and parallel to the lower surface 202 rather than ramped. The upper surface may also be linearly or nonlinearly ramped in thickness toward the rib end 216 and the hooked portion 210. The apparatus 200 may be injection molded plastic, machined, or formed of any other conventional material or may also be formed as part of the baseplate 102. The apparatus may be removably fastened to the baseplate 102 via screw 207 or may be adhesively bonded to the baseplate 102. In the latter instance, the mounting tab portion 208 could be eliminated. The apparatus 200 also may eliminate the need for the magnetic latch assembly 122 shown in FIG. 1 to be used. Accordingly, all such modifications, changes and alternatives are encompassed in the spirit of the invention disclosed and as defined in the appended claims.

What is claimed is:

1. An air vane windage accelerator apparatus for use in a disc drive having a baseplate, a spin motor mounted on the baseplate for rotation of a disc mounted on the motor, the disc having a data recording media extending between an inner radius and an outer radius on one or more surfaces of the disc, an actuator assembly mounted on the baseplate for rotation of an actuator arm over the one or more surfaces of the disc, and an air vane air filter and latch pivotally mounted for rotation adjacent the outer radius between a latched position and an unlatched position, the apparatus comprising:

a unitary body fastened to the baseplate beneath the disc, the body having a base portion and an upright air vane rib extending toward an underside surface of the disc from the base and substantially extending toward the air vane filter for accelerating wind generated by the rotating disc toward the air vane air filter.

2. The apparatus according to claim 1 wherein the air vane rib is curved.

3. The apparatus according to claim 2 wherein the base portion has a ramped upper surface.

4. The apparatus according to claim 3 wherein the ramped upper surface ramps upward toward the rotating disc and toward the air vane filter and latch.

5. The apparatus according to claim 4 wherein the base portion further comprises a mounting tab portion adapted to be fastened to the baseplate via a spin motor mounting screw and a hooked tab portion adapted to fit beneath a portion of the air vane filter and latch.

6. The apparatus according to claim 2 wherein the base portion further comprises a mounting tab portion adapted to be fastened to the baseplate via a spin motor mounting screw.

7. The apparatus according to claim 2 wherein the base portion further comprises a hooked tab portion adapted to fit beneath a portion of the air vane filter and latch.

8. The apparatus according to claim 1 wherein one end of the air vane rib is positioned adjacent the air vane filter and latch.

9. A disc drive having a baseplate, a spin motor mounted on the baseplate, a data storage disc having a data storage media on a surface thereof between an inner radius and an outer radius, the disc being rotatably mounted on the spin motor, an actuator assembly mounted to the baseplate adjacent the data storage disc for movement of one or more actuator arms over the surfaces of the disc, and an air vane air filter and latch pivotally supported adjacent the disc for rotational movement between a latched position and an unlatched position wherein the air vane air filter and latch prevents rotation of the actuator arms over data portions of the disc unless the spin motor is rotating the data storage disc at operational speed, the disc drive comprising:

a unitary body fastened to the baseplate beneath the disc, the body having a base portion and an upright air vane rib extending upward toward an underside surface of the disc from the base and substantially extending from the inner radius of the disc to the outer radius of the disc for accelerating wind generated by the rotating disc toward the air vane air filter.

10. The disc drive according to claim 9 wherein the air vane rib is curved.

11. The disc drive according to claim 10 wherein the base portion has a ramped upper surface.

12. The disc drive according to claim 11 wherein the ramped upper surface ramps upward toward the rotating disc and toward the air vane filter and latch.

13. The disc drive according to claim 12 wherein the base portion further comprises a mounting tab portion adapted to be fastened to the baseplate via a spin motor mounting screw and a hooked tab portion adapted to fit beneath a portion of the air vane filter and latch.

14. The disc drive according to claim 10 wherein the base portion further comprises mounting tab portion adapted to be fastened to the baseplate via a spin motor mounting crew.

15. The disc drive according to claim 10 wherein the base portion further comprises hooked tab portion adapted to fit beneath a portion of the air vane filter and latch.

16. The disc drive according to claim 9 wherein one end of the air vane rib is positioned adjacent the air vane filter and latch.

17. A disc drive having a baseplate, a spin motor mounted on the baseplate, a data storage disc having a data storage media on a surface thereof between an inner radius and an outer radius, the disc being rotatably mounted on the spin motor, an actuator assembly mounted to the baseplate adjacent the data storage disc for movement of one or more actuator arms over the surfaces of the disc, the disc drive comprising:

an air vane air filter and latch pivotally supported adjacent the disc for rotational movement between a latched position and an unlatched position wherein the air vane air filter and latch prevents rotation of the actuator arms over data portions of the disc unless the spin motor is rotating the data storage disc at operational speed; and a means fastened to the baseplate for directing wind generated by rotation of the disc toward the air vane air filter and latch.

\* \* \* \* \*